Inventor
John Crowe

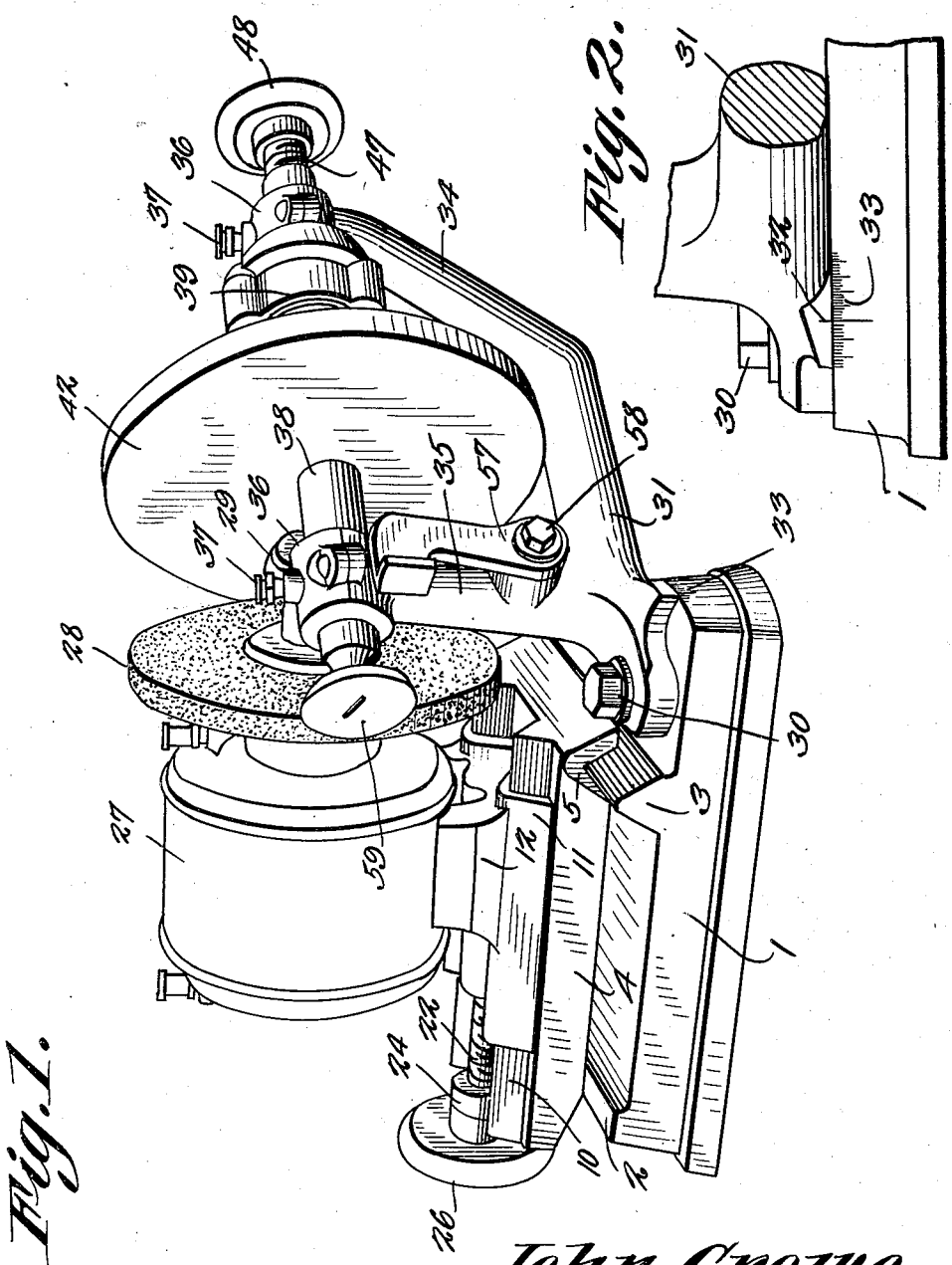

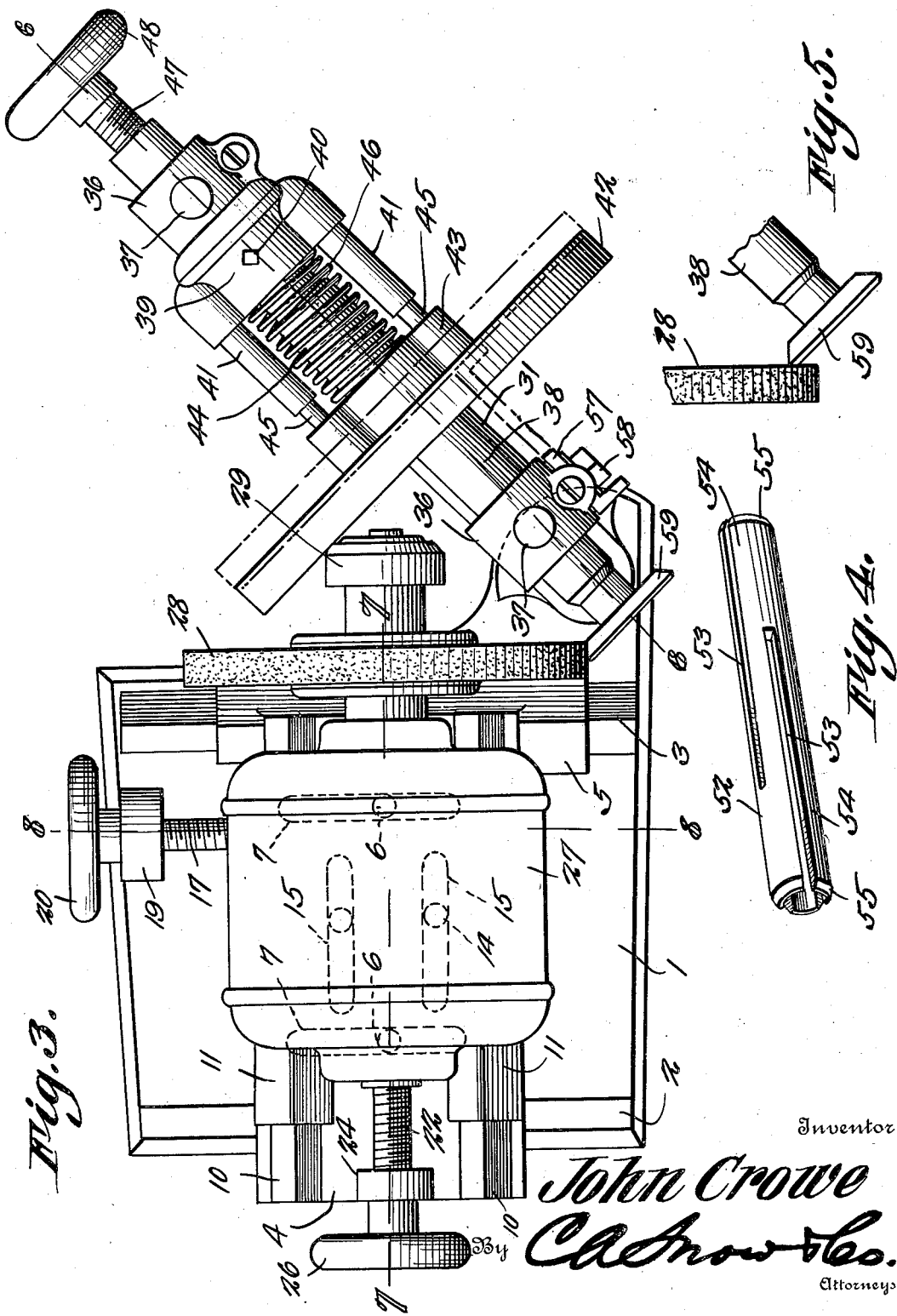

Patented Oct. 7, 1924.

1,510,831

UNITED STATES PATENT OFFICE.

JOHN CROWE, OF ST. JOSEPH, MISSOURI, ASSIGNOR TO LISLE MFG. CO., OF CLARINDA, IOWA.

VALVE GRINDER.

Application filed October 30, 1922. Serial No. 597,903.

*To all whom it may concern:*

Be it known that I, JOHN CROWE, a citizen of the United States, residing at St. Joseph, in the county of Buchanan and State of Missouri, have invented a new and useful Valve Grinder, of which the following is a specification.

This invention aims to provide a simple means whereby the valves of an internal combustion engine may be ground, a novel means being supplied for imparting rotation to the member which carries the valve, without resorting to complicated gear trains or the like. The invention contemplates, further, the provision of novel means for yieldingly advancing one friction element of the driving mechanism, with respect to another element thereof, so that a proper cooperation between the driving elements may be secured, it being possible, at the will of an operator, to move one of the driving elements backwardly, thereby breaking the driving engagement between said elements. Another object of the invention is to supply novel means for gripping the valve in the member whereby rotation immediately is imparted to the valve.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings:—

Figure 6:
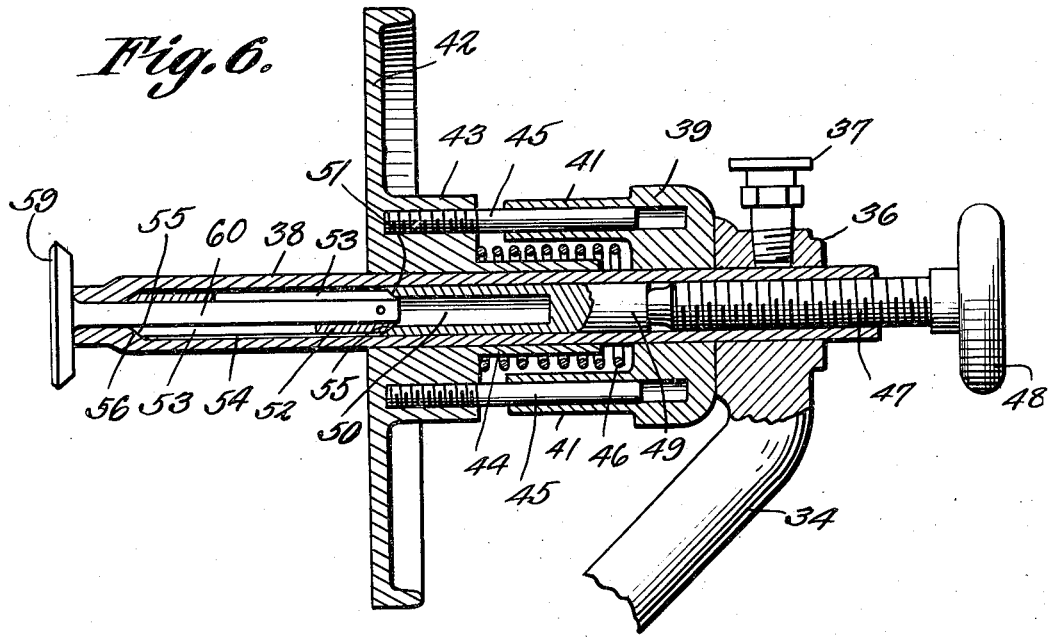
Figure 7:
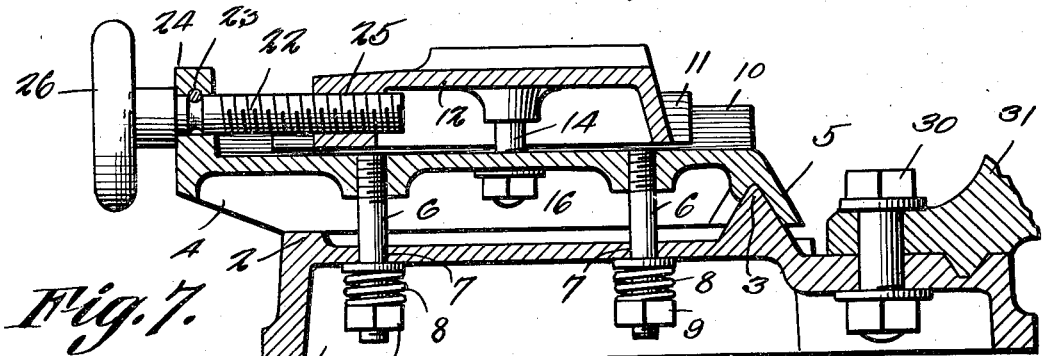
Figure 8:
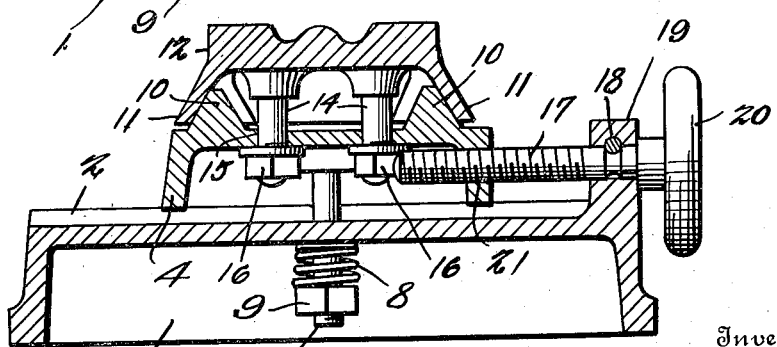

Figure 1 shows in perspective, a device constructed in accordance with the invention; Figure 2 is a fragmental elevation, showing the index mechanism whereby the bracket may be set at any desired angle; Figure 3 is a top plan showing the complete machine; Figure 4 is a perspective view of the holder which retains the valve during the rotation of the valve; Figure 5 is a diagrammatic plan illustrating the relative positions of sundry parts when the valve is being finished off; Figure 6 is a section on the line 6—6 of Figure 3; Figure 7 is a section on the line 7—7 of Figure 3; Figure 8 is a section on the line 8—8 of Figure 3.

The machine forming the subject matter of this application embodies a frame, including a base 1, provided with a transverse supporting rib 2 and with a guiding rib 3 disposed parallel to the rib 2. A carriage 4 is mounted for reciprocation on the ribs 2 and 3 and has a guide 5, which, coacting with the rib 3, holds the carriage 4 on the base 1 for right line sliding movement. The carriage 4 is equipped with depending studs 6 movable in elongated slots 7 which are fashioned in the base 1. Compression springs 8 surround the lower ends of the studs 6, as shown in Figure 7, the upper ends of the springs abutting against the top of the base 1, the lower ends of the springs abutting against adjusting devices 9 such as nuts, which are threaded on the lower ends of the studs 6. The construction, obviously is such that the carriage 4 is held on the base 1, frictionally, for sliding movement on the ribs 2 and 3. On its upper surface, the carriage 4 is provided with ribs 10, disposed at right angles to the ribs 2 and 3 of the base 1.

A rider 12 is provided, the same having transverse guides 11 adapted to cooperate with the ribs 10 on the carriage 4, to hold the rider for right line sliding movement on the carriage. The rider 12 has depending studs 14, received in elongated slots 15 in the carriage 4, nuts 16 being threaded on the studs, and the nuts coacting with the top portion of the carriage 4, as shown in Figure 7.

A screw 17 or like feeding means is held for rotation, as at 18, in a lug 19 which upstands from the base 1, the screw having a turning head 20, and being threaded, as at 21, into the carriage 4. A screw 22 is held for rotation, as at 23, in a lug 24 which upstands from the carriage 4, the screw being threaded at 25 into the rider 12, and being provided at its outer end with a turning head 26.

A prime mover, for instance, an electric motor 27, is attached to the rider 12, the motor being so constructed that it will operate advantageously at the proper speed. To the shaft of the electric motor 27, a grinding wheel 28 is secured, the shaft of the motor carrying a friction drive wheel 29.

A combined clamping and pivot element, generally a bolt 30, is mounted in the base 1, and thereon a bracket 31 is mounted to swing for adjustment, it being possible to hold the bracket in adjusted positions by tightening the bolt 30. In order to adjust the angle which the bracket 31 assumes, to the end that the desired bevel may be put upon the valve which is being ground, the bracket 31 has an index 32 which, as shown in Figure 2, is adapted to cooperate with a scale 33 inscribed on the base 1. The bracket 31 embodies arms 34 and 35, supplied with bearings 36 having suitable lubricating means 37.

The machine includes rotatable means for holding the valve which is to be ground, and, with this end in view, a hollow shaft 38 is mounted for rotation in the bearings 36. A hub 39 is secured at 40 to the shaft 38 and is supplied with outstanding tubular guides 41. The numeral 42 designates a friction wheel, adapted to cooperate with the friction wheel 29 on the shaft of the electric motor 27, the friction wheel 42 being slidable on the hollow shaft 38 and including a hub 43 having a sleeve 44 surrounding the shaft 38. Arms 45 project from the hub 43 and are received slidably in the guides 41 on the hub 39 of the shaft 38. A compression spring 46 surrounds the sleeve 44, one end of the spring abutting against the hub 43 of the friction wheel 42, the other end of the spring abutting against the hub 39 which is fixed to the shaft 38. The spring 46 tends to press the hub 39 against the bearing 36 on the arm 34 of the bracket 31, and tends to advance the friction wheel 42 longitudinally of the shaft 38, thereby to maintain the friction wheel in driving engagement with the wheel 29 on the shaft of the electric motor 27. A latch 57 is pivoted at 58 to the arm 35 of the bracket 31, the latch being adapted to cooperate with the friction wheel 42 as and for a purpose to be set forth hereinafter.

A feed screw 47 is threaded into the outer end of the shaft 38 and has a turning head 48. A slide 49 in the form of a sleeve is mounted for reciprocation in the shaft 38 and is engaged by the inner end of the feed screw 47, the slide having an axial opening 50, into which the stem of the valve to be ground may retire, should the stem of the valve be of considerable length. The inner end of the slide or sleeve 49 is beveled, as designated by the numeral 51. In the hollow shaft 38 a tubular holder 52 is mounted for endwise movement. The holder 52, as shown in Figure 4, is provided in its ends with longitudinal slots 53, defining resilient arms 54, the arms being beveled at their ends, as shown at 55, so as to cooperate with the beveled end 51 of the slide 49 and so as to cooperate with an inclined surface 56, formed within the hollow shaft 38, adjacent to the outer end thereof, as depicted in Figure 6.

In practical operation, the stem 60 of the valve 59 which is to be ground is inserted into the outer end of the hollow shaft 38 and into the holder 52. When the feed screw 47 is advanced, the slide or sleeve 49 is advanced also, longitudinal movement being imparted to the holder 52. When the holder 52 is advanced, the arms 54 at the outer end of the holder will be caused to grip the stem 60 of the valve 59, because the arms and the shaft 38 are mutually beveled, as indicated at 55—56. Similarly, the arms 54 at the inner end of the holder 52 will be caused to grip the stem 60 of the valve 59 owing to the beveling shown at 51—55 in Figure 6. The result is that the holder 52 has a double grip on the stem 60 of the valve 59, the valve thus being held securely to the shaft 38 for rotation therewith.

The spring 46 advances the friction wheel 42 along the shaft 38 and causes the friction wheel to cooperate with the wheel 29 on the shaft of the electric motor 27. The friction wheel 42 is held to the shaft 38, for rotation therewith, because the arms 45 on the friction wheel 42 are received in the guides 41 of the hub 39, the hub being secured at 40 to the shaft. It will be obvious that when the motor 27 is in operation, the driving elements 29 and 42 will impart rotation to the shaft 38 and to the valve 59. Through the instrumentality of the screw 22 (Figure 3) the rider 12 may be advanced on the carriage 4, the rider carrying with it the motor 27 and the grinding wheel 28, it being possible to move the grinding wheel across the edge of the valve 59 whilst the valve is being rotated in engagement with the grinding wheel. A shifting of the carriage 4, transversely of the axis of rotation of the grinding wheel 28, in order to accommodate valves of different diameters, or for any other purpose, may be brought about through the medium of the screw 17. Should the operator desire to move the wheel 42 out of engagement with the wheel 29, thereby to stop rotation of the shaft 38 and the valve 59, this may be done by swinging the latch 57 downwardly from the position shown in Figure 1, the latch cooperating with the friction wheel 42, to slide the friction wheel backwardly on the shaft 38, against the action of the spring 46 and when the latch 57 is in a horizontal position, the latch will hold the wheel 42 retracted and out of engagement with the wheel 29. The spring 46 serves to advance the wheel 42 yieldingly for engagement with the wheel 29, and even though there may be some lost motion in parts of the machine, there will be no chattering engagement between the wheels 42 and 29, or between the valve 59 and the grinding wheel 28. After the bevel has been ground on the valve 59, with the parts positioned as shown in Figure 3, it is possible to retract the rider 12 by means of the screw 22, the carriage 4 and parts mounted thereon being advanced by the screw 17, whereupon the valve 59 will be so positioned as to cooperate with the side surface of the grinding wheel 28 as appears in Figure 5, any burr or roughness on the edge of the valve being ground away.

What is claimed is:—

1. In a device of the class described, a base, a carriage mounted for straight line sliding adjustment on the base, a rider mounted for straight line sliding adjustment on the carriage at an angle to the direction in which the carriage is adjustable on the base, a motor on the carriage, a grinding member carried by the motor, a bracket mounted to swing on the base for adjustment, a valve-holding shaft journaled on the bracket, a friction wheel mounted on the shaft for rotation therewith and for sliding movement therealong, a drive wheel carried by the motor and movable along the friction wheel toward and away from the axis of rotation of the friction wheel, and spring means for holding the friction wheel engaged with the drive wheel.

2. A device of the class described, constructed as set forth in claim 1, and further characterized by the provision of movable means under the control of an operator and mounted on the bracket for holding the friction wheel out of engagement with the drive wheel, against the action of the spring means.

In testimony that I claim the foregoing as my own, I have hereto affixed my signature in the presence of two witnesses.

JOHN CROWE.

Witnesses:
F. L. SEARCH,
MASON B. LAWTON.